Jan. 5, 1971  C. B. MILLER ET AL  3,553,159

MOLDED ARTICLE AND MOLDABLE COMPOSITION

Filed May 22, 1967

Inventors:
Carl B. Miller
Richard A. Clark
David T. Retford
Carl W. Lundgren
By Hofren, Wegner,
Allen, Stellman & McCord Attys United States Patent Office 3,553,159
Patented Jan. 5, 1971

3,553,159
MOLDED ARTICLE AND MOLDABLE
COMPOSITION
Carl B. Miller and Richard A. Clark, Muskegon, Mich., and David T. Retford and Carl W. Lundgren, Cincinnati, Ohio, assignors to Brunswick Corporation, a corporation of Delaware
Filed May 22, 1967, Ser. No. 640,308
Int. Cl. C08d 9/10
U.S. Cl. 260—41.5        13 Claims

ABSTRACT OF THE DISCLOSURE

A golf ball having at least the core portion of a composition including a major proportion of polybutadiene predominating in cis-polybutadiene units, a small amount of plasticizer (low molecular weight polyethylene), a cross-linking agent (butylene dimethacrylate) and catalyst (dicumyl peroxide) for the cross-linking agent, and a significant proportion of polyvinyl chloride or bisphenol A-epichlorhydrin polycondensation product as a reinforcing modifier for strengthening the polybutadiene under golf club impact conditions.

---

Figure 1:
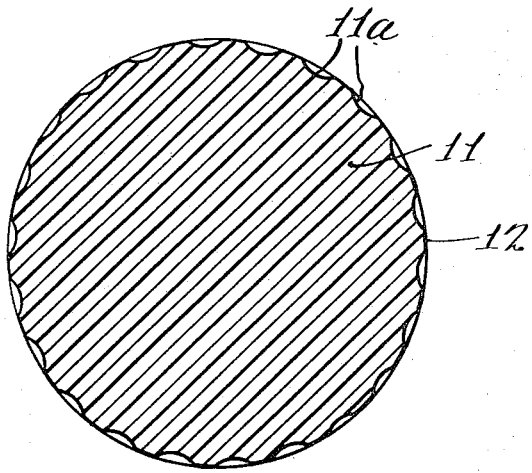

This invention relates to molding compositions which can be used in making a molded article such as a golf ball or the like. The invention also relates to articles formed from the composition. More particularly this invention relates to a new and useful ball having excellent characteristics rendering it useful as a golf ball and further relates to a reinforced rubber composition from which the ball is manufactured.

Present day golf balls conventionally include three portions: a core, a rubber band winding around the core, and a cover over the rubber band winding. In the development of modern golf balls, balls of solid material and synthetic materials have been suggested. It was also found that the ball could be improved by providing a resilient core portion and a tough impact-resistant cover portion. After further development it was realized that rubber band windings under tension about the core portion improved the playing characteristics of the ball. This is still considered by many to be the optimum combination and so attention more recently has focused on improvement of the core portion by providing liquid center cores and the like.

A variety of materials have been used for the various component parts of golf balls. For example, natural rubber has been suggested and it has even been proposed to provide a golf ball entirely of natural rubber, e.g. with some exterior toughening as by vulcanization of the outer portion. More recently a number of synthetic polymers have been developed as substitutes for rubber. Among these are polymers of butadiene, e.g. of the type which have found wide acceptance in the manufacture of automobile tires. The rebound properties of polybutadiene and especially cis-polybutadiene have made this synthetic rubber particularly adaptable to ball manufacture, and it has been proposed to manufacture golf balls of vulcanized polybutadiene. Both the cis- and trans-polybutadienes, alone or as blends with natural rubber, have been taught for use in the manufacture of balls, the cis and trans forms having somewhat different properties for imparting various characteristics to the ball or to a component part of the ball.

With respect to the cis form of polybutadiene, some properties, if considered by themselves, would tend to indicate that this material would be a good candidate for manufacture of golf balls. These properties are its excellent rebound characteristics, good resilience, and adequate tensile strength, although the tensile strength is somewhat less than that of natural rubber. However, the cis-polybutadiene tends to fracture under impact, has low fatigue life, has poor compression and produces an unacceptable ball click sound when struck with a club during the game of golf.

It is a general object of this invention to provide a new and useful molding composition from which improved golf balls and like articles can be molded and which contains cis-polybutadiene as a basic ingredient.

Another general object of this invention is to provide a new and useful article of manufacture such as a golf ball made of the composition of the foregoing object.

Still another object of this invention is to modify a cis-polybutadiene composition by incorporating therein a suitable resinous reinforcing agent or modifier for the purposes of the foregoing objects.

Yet another object of this invention is to provide a golf ball or the like which is made of a cross-linked polymer of polybutadiene containing a predominance of cis-polybutadiene and modified with the reinforcing agent of the foregoing object.

Still another object of this invention is to provide a formulation which is specifically adapted for manufacture of improved golf balls, which composition includes, as a basic ingredient, the cis-polybutadiene and also includes a modifier, plasticizer and/or catalyzed cross-linking agent for imparting improved playing characteristics to the ball.

Figure 2:
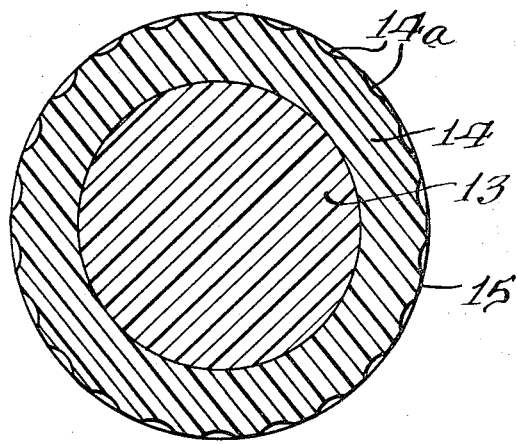

Other objects of this invention will be apparent from the following description and the drawing in which:

FIG. 1 is a section through an article of this invention in the form of a golf ball; and FIG. 2 is a section through another embodiment of the article in the form of a golf ball.

While this invention is susceptible of embodiment in many different forms, there is shown in the drawing and will herein be described in detail an embodiment of the invention, together with modifications thereof, with the understanding that the present disclosure is to be considered as an exemplification of the principles of the invention and is not intended to limit the invention to the embodiments illustrated.

Turning to the drawing, in FIG. 1 there is illustrated an article of this invention in the form of a golf ball which comprises a spherical mass 11 of a molded composition of this invention and a layer of white paint 12 covering the mass 11. The mass 11, in essence, constitutes a homogeneous solid golf ball with the molded composition substituted for the center, windings and cover of a modern ball. Mass 11 is molded in a conventional golf ball cover mold and has dimples 11a in conventional manner on the outer spherical surface thereof.

FIG. 2 illustrates another form of golf ball in which the core portion 13 is composed of and molded from a molding composition of this invention, e.g. by molding in a golf ball core mold. The central core 13 is covered in conventional manner wtih a golf ball cover 14 having surface dimples 14a and coated with a thin layer of paint 15. Molding of the cover can be accomplished conventionally by centering the core 13 in a mold and molding the cover thereabout. Suitable cover materials are balata and the various synthetic resins which have been proposed for golf ball cover manufacture. A suitable paint for layers 12 and 15 is a white pigmented urethane or polyurethane paint composition.

The molding composition of the present invention includes a rubber component containing a polymer of butadiene as the basic component. The rubber component is present in a major amount when compared with any other single ingredient of the composition. The rubber component contains at least 60% cis-polybutadiene. The composition also contains a reinforcing modifier selected from the class consisting of polyvinyl chloride and a thermoplastic polycondensation product of bisphenol A and epichlorhydrin, each of which is compatible with the rubber component. In the most advantageous form of the formulation or composition, there is present a cross-linking monomer for cross-linking the rubber component. The cross-linking agent may also function to cross-link any other polymeric ingredients which may be present in the formulation. One such other polymeric ingredient which is present in the preferred form of the formulation is a low molecular weight polymeric plasticizer, such as polyethylene. An example of a suitable polymeric plasticizer is Epolene N-11 which is a low molecular weight polyethylene designed for compounding rubber formulations.

The preferred relative amounts of aforementioned ingredients are as follows

| Ingredient: | Parts by wt. |
|---|---|
| Rubber component including cis-polybutadiene | 100 |
| Reinforcing modifier | 10-90 |
| Polymeric plasticizer | 0-10 |
| Cross-linking monomer | 5-50 |

As mentioned, the cross-linking monomer is used to cross-link at least the rubber component of the composition, and for such purposes it is preferred that a polymerization catalyst be present in the composition, although the cross-linking agent can be polymerized by subjecting the formulation to sufficient heat or other polymerization conditions. The polymerization catalyst is used in a catalytically effective amount and usually in an amount ranging from 0.1% based on the cross-linking monomer to 5% based on the total monomer plus rubber component plus other cross-linkable components such as the polymeric plasticizer. The preferred range of catalyst is from 0.5 to 10 parts by weight per 100 parts by weight rubber component. The polymerization catalyst is capable of initiating polymerization of ethylenically unsaturated groups and can be, for example, a free radical type polymerization catalyst. Tht preferred catalysts are the peroxides, including hydroperoxides and peracids, such as dicumyl peroxide, benzoyl peroxide, cumene hydroperoxide, t-butyl hydroperoxide, methylethylketone peroxide, peracetic acid, t-butyl perphthalates, and the like.

In addition to the aforementioned ingredients, solid particulate filler materials can be included in the formulation as needed or desired to impart specific properties to the molded article. For example, for golf ball applications, such filler materials as zinc oxide, magnesium oxide, silica, hydrated silica such as HiSil 233, carbon black, lithium oxide, and the like, can advantageously be used to improve tht scratch and abrasion resistance of the composition. These filler materials are conventional.

The rubber component, as mentioned, contains at least 60% cis-polybutadiene. Examples of suitable rubber components are polybutadiene polymerized with a stereospecific catalyst to provide at least 60% cis-polybutadiene with the remainder trans-polybutadiene and/or 1,2-polybutadiene; copolymers, including block copolymers and interpolymers, of cis-polybutadiene with other polymeric materials such as polystyrene, polyisoprene, polyethylene, polyvinylidene chloride, polyvinyl chloride, polytetrafluoroethylene, and the like; blends of cis-polybutadiene with natural rubber and other synthetic rubbers such as nitrile rubber, GRS rubber, Buna-N, etc., and the like.

The modifier is either polyvinyl chloride or a thermoplastic polycondensation product of bisphenol A and epichlorhydrin. Specific examples are Geon 101 which is a polyvinyl chloride homopolymer marketed by B. F. Goodrich Chemical Company and Bakelite phenoxy resin PAHJ or PKHH which are thermoplastic phenoxy resins having a basic chemical structure similar to that of epoxy resins but differing from epoxy resins by their high molecular weight of about 30,000 and by the absence of terminal high reactivity epoxy groups. Other useful reinforcing modifiers will be evident to those in the art.

The cross-linking monomer can be any of the monomers having at least two ethylenically unsaturated polymerizable groups including the hydrocarbon monomers such as isoprene, butadiene, divinyl benzene, and the like; the polyallyl esters of polycarboxylic acid such as diallyl phthalate, triallyl citrate, diallyl fumarate, triallyl trimellitate, etc.; the polyallyl ethers such as diallyl diethylene glycol, diallyl trimethylol propane, and the like; the unsaturated low molecular weight esters of polycarboxylic acids and mono- or polyhydric alcohols, monocarboxylic acids, and the esters of unsaturated monocarboxylic acids and polyhydric alcohols such as allyl fumarate, diallyl fumarate, low molecular weight esters of meleic acids and ethylene glycol or the like, glycol fumarate, etc. Particularly preferred cross-linking monomers are the polyacrylic esters of polyols, which are formed by esterifying at least two molecules of an acrylic acid, such as methacrylic, ethacrylic, chloroacrylic, acrylic, or cyanoacrylic acid, with a suitable polyol; these inlude butylene glycol dimethacrylate, ethylene glycol dimethacrylate, ethylene glycol dichloroacrylate, triethylene glycol diethacrylate, tetraethylene glycol dimethacrylate, trimethylol propane trimethacrylate, glycerol trimethacrylate, cyclohexanediol dimethacrylate, tetramethylol cyclohexane triacrylate, ethylene glycol dicyanoacrylate, and the like.

The reinforcing modifier apparently functions to improve the impact resistance, low fatigue life and poor compression of the cis-polybutadiene and also imparts good ball click sound to a golf ball molded from the formulation. At the same time the modifier does not adversely materially detract from the good rebound properties of the cis-polybutadiene. The polyethylene plasticizer is used in the preferred balls in a small amount, but even the small amount is effective as a plasticizer; other plasticizers can also be used as desired, or the plasticizer can be omitted entirely. Accordingly, knowing the properties improved by each ingredient, formulators in the art can select the proportions of ingredients to be used for their own particular applications.

In order to exemplify the compositions of the present invention, two examples and one comparative preparation are offered. The examples are by way of illustration and are not intended as limitations on the inventive concept. The two examples and the preparation were prepared using the ingredients in the following table in the amounts indicated and using the procedure immediately following the Table I.

TABLE I.—FORMULAS

| Material | Parts | | Preparation |
|---|---|---|---|
| | Ex. I | Ex. II | |
| Budene 501 [1] | 100 | 100 | 100 |
| Phenoxy PAHJ | 43 | 0 | 0 |
| Geon 101 (PVC) | 0 | 43 | 0 |
| Low molecular weight polyethylene (plasticizer) | 3 | 3 | 3 |
| Dicumyl peroxide | 1.50 | 1.50 | 1.50 |
| Fillers | 28 | 28 | 28 |
| Butylene dimethacrylate | 25 | 25 | 25 |

[1] 90-95 percent cis- and remainder trans-polybutadiene.

Rubber mill rolls were heated to 240° F. for Example I and Example II, while a cold mill of less than 100° F.

was used for the preparation. A small portion of the Budene was banded on the rolls. In Examples I and II the reinforcing modifier was then added and dispersed as granules. The mill roll temperature was increased to obtain a 270–280° F. stock temperature for Example I and 290° F. for Example II so that the reinforcing modifier could be mixed in smoothly. The polyethylene was then added and milled in. The stock in Examples I and II was then removed and cooled to room temperature and was rebanded on a cold mill at less than 100° F. The remaining components were added and mixed in the order shown in the above table.

Each of the stocks prepared as above was formed into a solid rod of 1½ inches in diameter and cut into lengths such that each piece weighed 1.8 ounces. The rods were formed by rolling a thin sheet of the stock into a rod shape, although extrusion of the rod shapes would more advantageously be used. A series of balls was prepared from each stock. For each ball, cut piece from the stock was placed in a golf ball mold and then the mold was closed in a press. The material was cured for 20 minutes at a temperature of 320° F. in the closed mold. The mold was then opened and the cured ball removed.

The balls were finished by a standard procedure, painted with a polyurethane paint, and finally stamping printed indicia on the ball.

A series of balls was prepared from each of the formulations of Examples I and II and the preparation according to the foregoing procedure. The balls were tested for a number of properties and the results are listed in Table II below. Each test conducted is conventional and further explanations of some of the tests are included following the table.

TABLE II.—BALL PROPERTIES

| Property | Example I | Example II | Preparation |
|---|---|---|---|
| Resin reinforcer | (¹) | (²) | None |
| Ball weight, ozs | 1.572 | 1.623 | 1.530 |
| Max. ball diameter, inch | 1.677 | 1.677 | 1.669 |
| Diameter variation, inch | .002 | .002 | .003 |
| Compression | 49 | 52 | 6 |
| Rebound, 72″ drop, percent | 73 | 72 | 72 |
| Cut resistance, drops | 15 | 5 | 11 |
| Initial velocity, ft./sec | 242.3 | 242.4 | 241.0 |
| Fatigue life, blows | 167 | 200+ | 48 |
| Notched fatigue life, blows | 60 | 54 | |
| Ball click | (³) | (³) | (⁴) |
| Hardness of cured composition, Shore D | 46 | 47 | 37 |

¹ Phenoxy.
² PVC.
³ Good.
⁴ Poor.

The compression was tested on an Atti Engineering Corporation golf ball compression tester. This tester is a device which measures the resistance of a golf ball to deformation. The tester consists of a lower movable platform and an upper, movable, spring loaded anvil. A dial indicator is mounted such that it measures the upward movement of the spring loaded anvil. A golf ball is placed on the lower platform, which is then raised a fixed distance. The upper portion of the golf ball comes in contact with and exerts a pressure on the spring loaded anvil. Depending on the resistance of the golf ball to be compressed, the upper anvil is forced upward against the spring. The dial indicator, showing the amount of movement of the anvil, reads in arbitrary units from 0 to 100. A maximum compression of 200 can be measured and is indicated by two revolutions of the dial indicator.

The Cut Resistance Test is conducted by impacting a ball with a guillotine blade weighing 5 pounds and dropping from a 20-inch height. The results are the number of drops required to cut the ball.

The Initial Velocity and Fatigue Life were tested on a USGA design velocity test machine. The USGA velocity test machine is a device developed and used by the United States Golf Association to control the liveliness of golf balls. This machine consists of a ball driving mechanism and a speed sensing section. A ball is placed in the machine and is mechanically positioned in line with a rotating flywheel. The flywheel, turning at a nominal speed of 1800 r.p.m., has a protruding lug which strikes the ball. The ball passes through and breaks a light beam causing a light sensor to start a timer. The ball then passes through a second light beam which causes a second light sensor to stop the timer. The distance between the light beams (10 feet) and the time required to travel this distance are used to calculate an initial velocity. Since the impact force is constant, the machine may be used to compare the liveliness, or resilience, of balls of different composition. The reported fatigue life is the number of blows until failure when the ball is struck repeatedly by the machine. Two blows roughly equal the wear caused by playing one hole of golf.

The Notched Test was conducted by cutting a notch in each ball such that a circular segment was described by the cut with the circular segment having a chord length of 0.90 inch and a height of 0.15 inch. The ball is then impacted by the USGA velocity test machine, and the number of impacts until failure is recorded. For comparison, a commercial ball designed for long playing life had a life of 35 impacts in this test.

The Ball Click Test was an audible sound test comparing the impact sound of the ball with that produced by a commercial golf ball, the impact sound of which has long been considered acceptable by players. The impact sounds of all of the balls tested were softer than the sound of the commercial ball with the balls of Examples I and II had a good "click" sound while that of the preparation did not.

All percents given herein are percents by weight unless otherwise indicated.

We claim:
1. A curable composition comprising a blend of a major amount of rubber having at least 60% of its structural units those of cis-polybutadiene, 10 to 90 parts by weight, per 100 parts by weight of said polymer, of a reinforcing modifier selected from the class consisting of polyvinyl chloride and a thermoplastic high molecular weight polycondensation product of bisphenol A and epichlorhydrin compatible with said butadiene polymer, and a cross-linking agent having at least two ethylenically unsaturated polymerizable groups in sufficient amount to cross-link said butadiene polymer.

2. The composition of claim 1 in which the blend includes a catalytic amount of a polymerization catalyst for polymerizing said cross-linking agent.

3. The composition of claim 1 including a minor amount of filler in said composition.

4. The composition of claim 1 including a small amount of low molecular weight polyethylene for plasticizing said composition.

5. The composition of claim 1 wherein said rubber is a stereo-specific polybutadiene containing at least about 90% cis structure.

6. The composition of claim 2 wherein said cross-linking agent is an acrylic ester of a polyol and has at least two acrylic groups.

7. The composition of claim 6 wherein said polymerization catalyst is a peroxide.

8. As an article of manufacture, a ball comprising a mass of solid cross-linked butadiene polymer containing at least 60% cis-polybutadiene and 10 to 90 parts by weight, per 100 parts by weight of said polymer, of a reinforcing modifying agent selected from the class consisting of polyvinyl chloride and a compatible thermoplastic high molecular weight polymer of bisphenol A and epichlorhydrin, said article being formed by curing the composition of claim 7.

9. The ball of claim 8 wherein said mass is spherical.

10. The ball of claim 9 consisting of said mass and a coating of white pigmented paint over said mass.

11. A golf ball comprising the ball of claim 9 including surface dimples and a layer of white paint coloring the spherical surface thereof.

12. The ball of claim 8 wherein said mass constitutes a central portion of the ball.

13. The ball of claim 8 wherein said mass includes an outer portion of the ball.

References Cited

UNITED STATES PATENTS

| | | | |
|---|---|---|---|
| 3,239,228 | 3/1966 | Crompton III | 273—218 |
| 3,313,545 | 4/1967 | Bartsch | 273—218 |
| 3,421,766 | 1/1969 | Chmiel et al. | 273—218 |

MORRIS LIEBMAN, Primary Examiner

R. H. ZAITLEN, Assistant Examiner

U.S. Cl. X.R.

260—837, 890; 273—218